United States Patent
Soffer et al.

(10) Patent No.: US 9,898,259 B2
(45) Date of Patent: Feb. 20, 2018

(54) DATA BINDING FOR MODEL-BASED CODE GENERATION

(71) Applicant: SAP Portals Israel Ltd., Ra'anana (IL)

(72) Inventors: Guy Soffer, Ra'anana (IL); Rotem Puterman-Sobe, Rishon-Lezion (IL); Guy Blank, Tel Aviv (IL)

(73) Assignee: SAP Portals Israel Ltd., Ra'anana (IL)

( * ) Notice: Subject to any disclaimer, the term of this patent is extended or adjusted under 35 U.S.C. 154(b) by 169 days.

(21) Appl. No.: 14/810,690

(22) Filed: Jul. 28, 2015

(65) Prior Publication Data

US 2016/0357520 A1 Dec. 8, 2016

Related U.S. Application Data

(60) Provisional application No. 62/169,746, filed on Jun. 2, 2015.

(51) Int. Cl.
*G06F 3/00* (2006.01)
*G06F 9/44* (2006.01)

(52) U.S. Cl.
CPC .............. *G06F 8/34* (2013.01); *G06F 8/36* (2013.01); *G06F 9/4446* (2013.01)

(58) Field of Classification Search
CPC .... G06F 17/248; G06F 3/0482; G06F 9/4443; G06F 8/60; G06F 17/30554; G06F 8/30; G06F 17/212; G06F 17/30893; G06F 8/10; G06F 8/34; G06F 8/35; G06F 8/03
See application file for complete search history.

(56) References Cited

U.S. PATENT DOCUMENTS

| 8,423,895 | B2 | 4/2013 | Friedman et al. |
| 8,997,038 | B2* | 3/2015 | Bozek ............... H04L 67/10 717/106 |
| 9,026,647 | B2 | 5/2015 | Soffer et al. |
| 9,036,648 | B2 | 5/2015 | Kubovsky et al. |

(Continued)

OTHER PUBLICATIONS

Arun Kumar; The Spoken Web Application Framework User Generated Content and Service Creation through low-end mobiles; 2010 ACM; 10 pages; <http://dl.acm.org/citation.cfm?id=1805990>.*

(Continued)

*Primary Examiner* — Thuy Dao
*Assistant Examiner* — Cuong V Luu
(74) *Attorney, Agent, or Firm* — Fish & Richardson P.C.

(57) ABSTRACT

The disclosure generally describes methods, software, and systems, including a method for using templates to generate data bindings for application code. A request is identified to instantiate an application based on a pre-defined template that is associated with an input data model that includes at least one reference to a design time data binding configuration model. A service, an associated service, and an associated data source are identified to be bound with the application. A parameter in the input data model is identified. Entry point data bindings for the data source are identified. A selection field is populated within a user interface using values within the data source corresponding to the entry points. A second selection field within the user interface is populated based on the selection from the first selection field. The second selection field is associated with at least one parameter in the input data model.

20 Claims, 3 Drawing Sheets

(56) References Cited

U.S. PATENT DOCUMENTS

| | | | | |
|---|---|---|---|---|
| 2003/0172010 | A1* | 9/2003 | Butani | G06Q 10/0875 |
| | | | | 705/29 |
| 2008/0263509 | A1* | 10/2008 | Brutman | G06F 8/20 |
| | | | | 717/104 |
| 2008/0301626 | A1* | 12/2008 | Sivaram | G06F 8/10 |
| | | | | 717/104 |
| 2011/0099532 | A1* | 4/2011 | Coldicott | G06F 8/10 |
| | | | | 717/105 |
| 2011/0161921 | A1* | 6/2011 | Garimella | G06F 8/10 |
| | | | | 717/105 |
| 2013/0262626 | A1* | 10/2013 | Bozek | H04L 67/10 |
| | | | | 709/217 |
| 2014/0317563 | A1* | 10/2014 | O'Byrne | G06F 17/30569 |
| | | | | 715/810 |
| 2014/0343981 | A1 | 11/2014 | Blank et al. | |
| 2015/0089403 | A1* | 3/2015 | Zhu | G06F 8/38 |
| | | | | 715/762 |
| 2015/0142781 | A1* | 5/2015 | Nigam | G06F 17/30557 |
| | | | | 707/722 |
| 2015/0186132 | A1* | 7/2015 | Oliveri | G06F 8/34 |
| | | | | 717/120 |
| 2016/0026366 | A1* | 1/2016 | Luan | G06F 3/04842 |
| | | | | 715/747 |

OTHER PUBLICATIONS

Uwe Zdun; Dynamically Generating Web Application Fragments from Page Templates; 2001 ACM; pp. 1113-1120; <http://dl.acm.org/citation.cfm?id=509010>.*

Ashwin Manjunatha et al.; Power of Clouds in Your Pocket: An Efficient Approach for Cloud Mobile Hybrid Application Development; 2010 IEEE; pp. 496-503; <http://ieeexplore.ieee.org/stamp/stamp.jsp?arnumber=5708492>.*

Elizabeth D. et al.; Mapping GUIS to Auditory Interfaces ; 1992 UIST; pp. 61-70; <http://dl.acm.org/citation.cfm?id=142629>.*

Tom Yeh et al.; Sikuli Using GUI Screenshots for Search and Automation; 2009 ACM; pp. 183-192; <http://dl.acm.org/citation.cfm?id=1622213>.*

Betsy Beier et al.; The Bulls-Eye A Framework for Web Application User Interface Design Guidelines; 2003 ACM; pp. 489-496; <http://dl.acm.org/citation.cfm?id=642697>.*

* cited by examiner

DATA BINDING FOR MODEL-BASED CODE GENERATION

CLAIM OF PRIORITY

This application claims priority under 35 USC § 119(e) to U.S. Patent Application Ser. No. 62/169,746 filed on Jun. 2, 2015, the entire contents of which are hereby incorporated by reference.

BACKGROUND

The present disclosure relates to the generation of code.

Application code developers can use manual and/or automatic ways to develop new application code. Automatic ways of developing application code can include, for example, the user of interactive development environments (IDEs) that provide a user interface for aiding in the code-generation process. Different IDEs exist, e.g., that are offered by different vendors. The development of code, whether automatic or not, can be based on (or can include) data bindings, e.g., that bind an application to at least one data source.

SUMMARY

The disclosure generally describes computer-implemented methods, software, and systems for using templates to generate application code. For example, a request to instantiate an application based on a pre-defined template is identified. The template is associated with an input data model that includes at least one reference to a design time data binding configuration model. A service is identified from a plurality of services to be bound with the application. The service is associated with at least one data source. A data source associated with the identified service to be specifically bound with the application is identified. The data source is associated with a schema. Identifying the data source can be optional. At least one particular parameter in the input data model of the template associated with the identified data source is identified. Entry point data bindings for the data source defined within the input data model of the template are identified. Identification can be done automatically or generically. At least one selection field is populated within an application development user interface associated with the application. The at least one selection field populated, for example, by values within the data source corresponding to the particular entry points. In response to receiving a selection from the first selection field, at least a second selection field within the application development user interface is populated based on the selection from the first selection field. The second selection field is associated, for example, with at least one parameter in the input data model and dependent upon selection in the first selection field.

The present disclosure relates to computer-implemented methods, software, and systems for generating executable components. One computer-implemented method includes: identifying a request to instantiate an application based on a pre-defined template, wherein the template is associated with an input data model including at least one reference to a design time data binding configuration model; identifying a service from a plurality of services to be bound with the application, wherein the service is associated with at least one data source; identifying a data source associated with the identified service to be specifically bound with the application, wherein the data source is associated with a schema; identifying at least one particular parameter in the input data model of the template associated with the identified data source; identifying entry point data bindings for the data source defined within the input data model of the template; populating at least one selection field within an application development UI associated with the application, wherein the at least one selection field is populated by values within the data source corresponding to the particular entry points; and in response to receiving a selection from the first selection field, populating at least a second selection field within the application development UI based on the selection from the first selection field, wherein the second selection field is associated with at least one parameter in the input data model dependent upon selection in the first selection field.

The foregoing and other implementations can each optionally include one or more of the following features, alone or in combination. In particular, one implementation can include all the following features:

In a first aspect, combinable with any of the previous aspects, the method further comprises receiving a selection of the pre-defined template from plural templates.

In a second aspect, combinable with any of the previous aspects, the service is identified from a service repository or a set of dynamically available services.

In a third aspect, combinable with any of the previous aspects, identifying entry point data bindings includes using a definition of an entry point binding as a root entry point "isRoot" for Odata to identify all the optional entry point bindings that you can do.

In a fourth aspect, combinable with any of the previous aspects, the method further comprises instantiating a wizard for performing data binding in an interactive way and performing the operations of the method using facilities of the wizard.

In a fifth aspect, combinable with any of the previous aspects, the template is configured for use with any of plural data sources.

In a sixth aspect, combinable with any of the previous aspects, populating the at least one selection field includes validating and filtering values associated with the at least one selection field.

In a seventh aspect, combinable with any of the previous aspects, populating the second selection field includes validating and filtering values associated with the second selection field.

The subject matter described in this specification can be implemented in particular implementations so as to realize one or more of the following advantages. Automatically identifying available services and their applicable data sources for a data binding can save development time and prevent errors. Names of services and data sources can be automatically included into application code without errors otherwise associated with user textual input. Software developers can perform data bindings without having to possess significant knowledge about schemas associated with data sources. Available data sources applicable to a service can be identified and displayed without writing additional user interface code.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
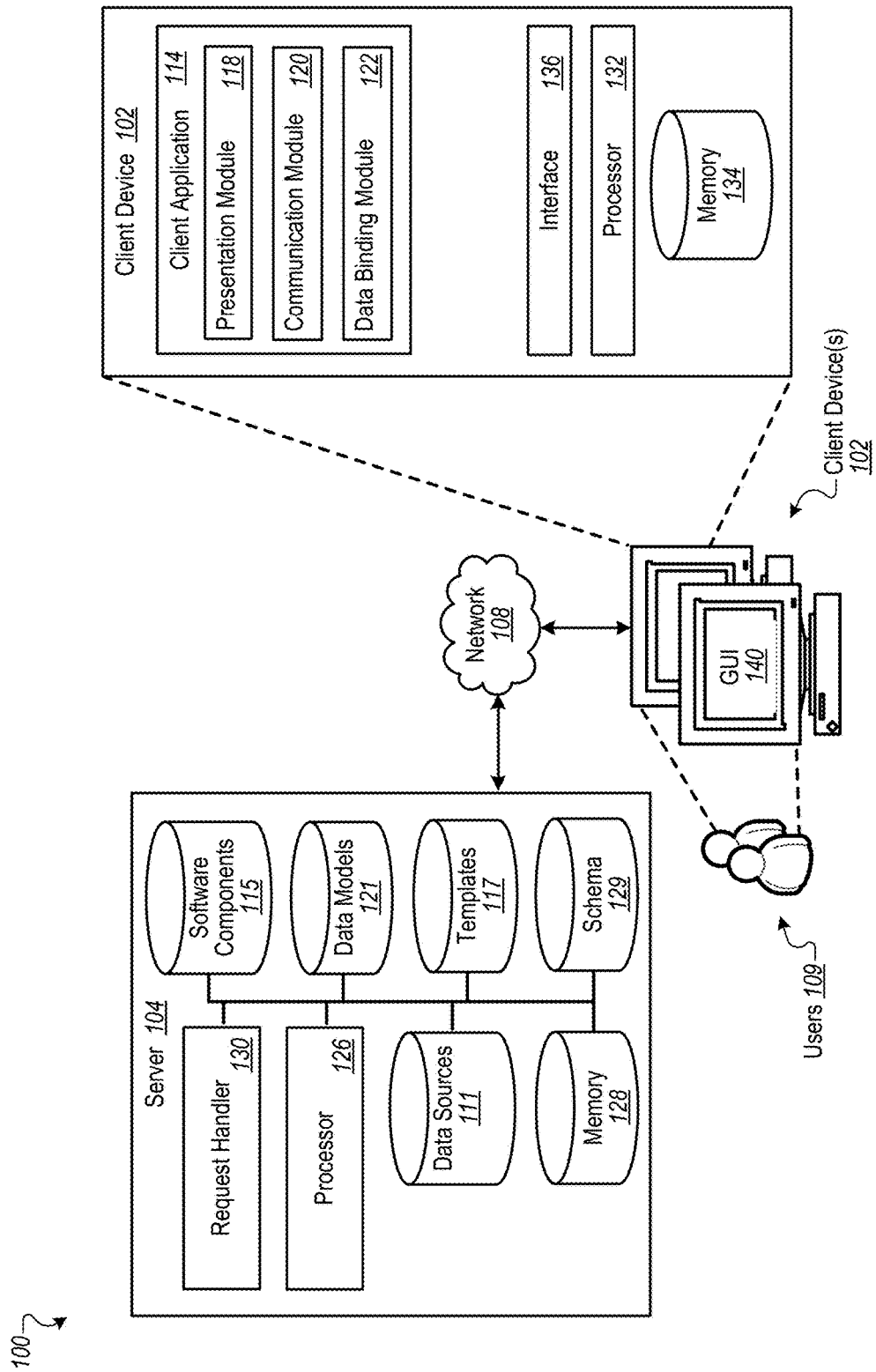
FIG. 1 is a block diagram of an example environment for completing data bindings between an application and data sources.

This disclosure generally describes computer-implemented methods, software, and systems for using templates to generate application code. For example, code generation done by an application developer can use templates that are based on template models. In some implementations, applications that use the templates can be integrated into development environments and can use a code generation engine. Each template can be defined by or encapsulated in, for example, a template package that describes the template's own, specific user interface, but that is similar to user interfaces of other templates used in the same framework. One benefit of this approach is that a template developer, when providing a template package, does not need to provide a user interface and logic code for obtaining inputs from the user during template use. This can be achieved, for example, through the use of a template model and template metadata files that are defined in the template package. A template developer, for example, can provide the same template package for any development environment (e.g., Eclipse, Visual Studio, SAP Web IDE). The same template package can be used in whatever development environment is being used, e.g., without requiring that proprietary code be written.

Typical template-based code-generation frameworks can usually include a proprietary template language syntax, a proprietary generator engine, and input data for code generation. To enable code generation for developers in these frameworks, some level of development effort is required for each specific template and its hosting environment (e.g., Eclipse, Visual Studio etc.). For example, the development effort can include integration into a selected code-generation framework, developing a custom user interface (UI) to support end-user input for each template, integration to a code-generation process (e.g., including custom user-input data), and the development of multiple templates. The overhead in such frameworks can be significant because of the need for a developer UI and logic artifacts for each template that is created. Adding support for additional code-generation frameworks can become more complex. Also, processes used in the frameworks can introduce inconsistencies in the design-time experience associated with the different templates. [Inventors: Any additional background you'd like to include?]

In some implementations, problems associated with typical frameworks can be solved using a declarative framework. For example, the declarative framework can provide a way for defining an input model for a template and describing the template's related design-time experience (e.g., including UI and logic), independent of a hosting environment and the code-generation framework. When needed, the declarative framework can provide hooks for advanced UI and logic implementation. As a result, the declarative framework can eliminate the effort needed in typical frameworks for developing a custom UI and logic for each template. The declarative framework can also provide seamless switching to different code-generation frameworks (e.g., template code can be still written in the respective template language syntax). The declarative framework can also provide a consistent experience for code-generation of any hosting environment or template. Further, the declarative framework can provide a design-time experience framework for templates. For example, the declarative framework can control the UI and logic of a selected template during design-time and can generate the code according to the aggregated end-user input. A template can be configured once generically and can be matched against any supported relational data source.

In some implementations, in order to integrate templates with the declarative framework, each template can additionally provide a declarative model file and metadata file. These files can be used by the declarative framework to construct the UI and trigger the respective logic and code-generation.

Application projects in development environments, such as integrated development environments (IDEs), can use or be based on code generation templates. However, typical development environments may not include data binding capabilities. For example, a template developer of business application can use the IDE to develop a skeleton of an application. The template developer may usually leave the data binding part of the application project for completion by an application developer, e.g., the consumer of the template.

In some implementations, an application can use a data source, for example, to display data in the UI and to execute operations for data manipulations triggered from the UI, such as updating, creating and/or deleting data. When creating an application from a template, for example, it can be very helpful to allow the user to customize these connections between the UI components in the application to the data source. e.g., identifying a source from which data of each UI component in the application is to come. This can be referred to as "data binding."

Consider, for example, a master-detail template that is to be used by an application developer to create a sales orders application. In processes used in development environments, for example, the application developer will need to define the binding in the sales orders service to the master and details views, e.g., including selecting the correct entity set, navigation, property, and other information. Such processes can require technical knowledge about the service protocol and binding mechanism to be known by both the template developer and the application developer. In order to compensate for this type of problem in typical development environments, the template developer would have to write custom complex code for each specific protocol/service that will enable the application developer to easily and correctly bind the application to a data source. In some implementations, the application developer can define the binding in, for example, a sales orders service to master and details views, e.g., when using an OData service, including selecting the correct entity set, navigation, property, and other information.

In some implementations, some solutions can provide a declarative way for the template developer to define data binding for a template, e.g., based on a data model. For example, the model can be used by the development environment to display a smart data binding configuration for the application developers. The smart data binding configuration can allow, for example, the application developer to receive only relevant suggestions associated with the template developer configuration.

FIG. 1 is a block diagram of an example environment 100 block diagram of an example environment for completing data bindings between an application and data sources. The illustrated environment 100 includes, or is communicably coupled with, plural client devices 102, and a server 104, all connected using a network 108. For example, the environment 100 can be used to provide access, for users 109 of the plural client devices 102, to resources provided by the server 104. Further, users 109 can use the client device 102 to automatically generate code, based on templates, with parameters customized by the user 109. The generated code can include data bindings (e.g. between the application and one or more data sources) that are defined by the user 109 using applications on the client device 102.

Although the architecture of the environment 100 includes the server 104 and plural client devices 102, other implementations can have different architectures. Specifically, the environment 100 does not specifically require a client-server environment. For example, some or all of the components of the server 104 can be located, at least in part, in the plural client devices 102. In some implementations, the environment 100 can include storage of the templates on the client side, and code generation can happen on the client. In some implementations, the environment 100 can facilitate most of the processing on the server side, e.g., storing templates and generating code, and the client side can provide the UI to customize the code generation. For example, the server 104 can serve solely or primarily as a data source, e.g., as the data that is exposed using some service. As such, the data itself may not be stored together with data that provides the templates and the binding solution.

At a high level, the server 104 comprises an electronic computing device operable to store and provide access to resources for use by the client device 102. A library of software components 115, for example, can include plural applications that are stored by the server 104, e.g., populated from code generated at the client device 102. For example, the software components 115 can include code generated automatically at the client device 102 using templates 117 stored at, or available from, the server 104. Software components 115 and templates 117 may be stored or distributed in plural locations, e.g., at the client device 102, at the server 104, and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS®, Java™, Android™, iOS or any other suitable operating system. According to some implementations, the server 104 may also include, or be communicably coupled with, an e-mail server, a web server, a caching server, a streaming data server, and/or other suitable server(s). In some implementations, components of the server 104 may be distributed in different locations and coupled using the network 108.

The server 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes one or more of the software components 115 (described above). Other components within the memory 128 are possible.

Each client device 102 of the environment 100 may be any computing device operable to connect to, or communicate with, at least the server 104 via the network 108 using a wire-line or wireless connection. In general, the client device 102 comprises an electronic computer device operable to receive, transmit, process, and store any appropriate data associated with the environment 100 of FIG. 1.

A request handler 130, e.g., can handle requests received from the client device 102. Specifically, the request handler 130 can process requests for resources (e.g., templates 117) received from the client application 114 (or its components 118-120). For example, a presentation module 118 can handle user interface aspects of applications that may use resources from the server 104, such as templates 117 for generating code. A communication module 120 can handle communication between the client application 114 and the server 104, for example. The request handler 130 can also receive requests to store code generated at the client device 102, e.g., for storage as software components 115.

The illustrated client device 102 further includes a processor 132, a memory 134, and an interface 136. The interface 136 is used by the client device 102 for communicating with other systems in a distributed environment—including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Javascript™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Data sources 111, for example, can comprise plural databases and/or other structures that hold data used in applications. In some implementations, the data sources 111 can be distributed to multiple external systems that are connected to the server 104, for example, over the network 108. Data sources 111, in this context, not only serve as the database holding the data, but also as the service for exposing it, e.g., a service that is implemented with any protocol which uses relational data model (as OData protocol). The schema can be used in this context for describing the service structure (e.g., which entity sets, properties and navigations are available for a specific service).

A schema 129 can include information associated with the organization of data available at the data sources 111. For example, the schema 129 can describe how a particular database is constructed, e.g., how relational databases are divided into individual database tables. In some implementations, the schema 129 for a data source 111 is stored with the data source 111 itself.

Templates 117, for example, can include software-related components and/or other structures from which applications can be generated, e.g., using customized parameters provided by the user 109. In some implementations, a template can be a piece of application code with placeholders for portions of the code to be customized by a software developer. Templates can include placeholders and/or other structures from which data bindings can be defined.

Data models 121, included in the server 104, can include information for subsequent fields associated with the template 117. The data models 121 can use a reference syntax that supports defining paths/pointers both in the specific input data model and in the design-time model file (e.g., XPath for XML, JSONPath for JSON (JavaScript Object Notation), etc.). The reference into the input data model can be a required element, for example. In some implementations, the smart binding configuration can optionally include filtering and validation parameters specific to the input data model, e.g., including filter parameters based on navigation property multiplicity, parameter types, entity types, and other information.

A data binding module 122, e.g., included in the client application 114, can use any relational data model (e.g., one of the data models 121) as input to create data bindings for an application. For example, data binding module 122 can use, for input, the data model 121, e.g., that holds the template data binding configurations as defined by the template developer in a generic way, regardless of a subsequently selected data source. The data binding module 122 can also use a relational data model service (e.g., one of data sources 111 that was selected by the user), together with its schema. By processing all of this input, the data binding module 122 can generate suggestions for the user regarding appropriate binding for each template parameter, e.g., as output of the data binding module 122. Smart binding configurations can be defined, for example, in a design-time model file which is part of the template, e.g., in the data model 121.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens for using templates and providing parameters for customizing the templates to generate code.

Figure 2:
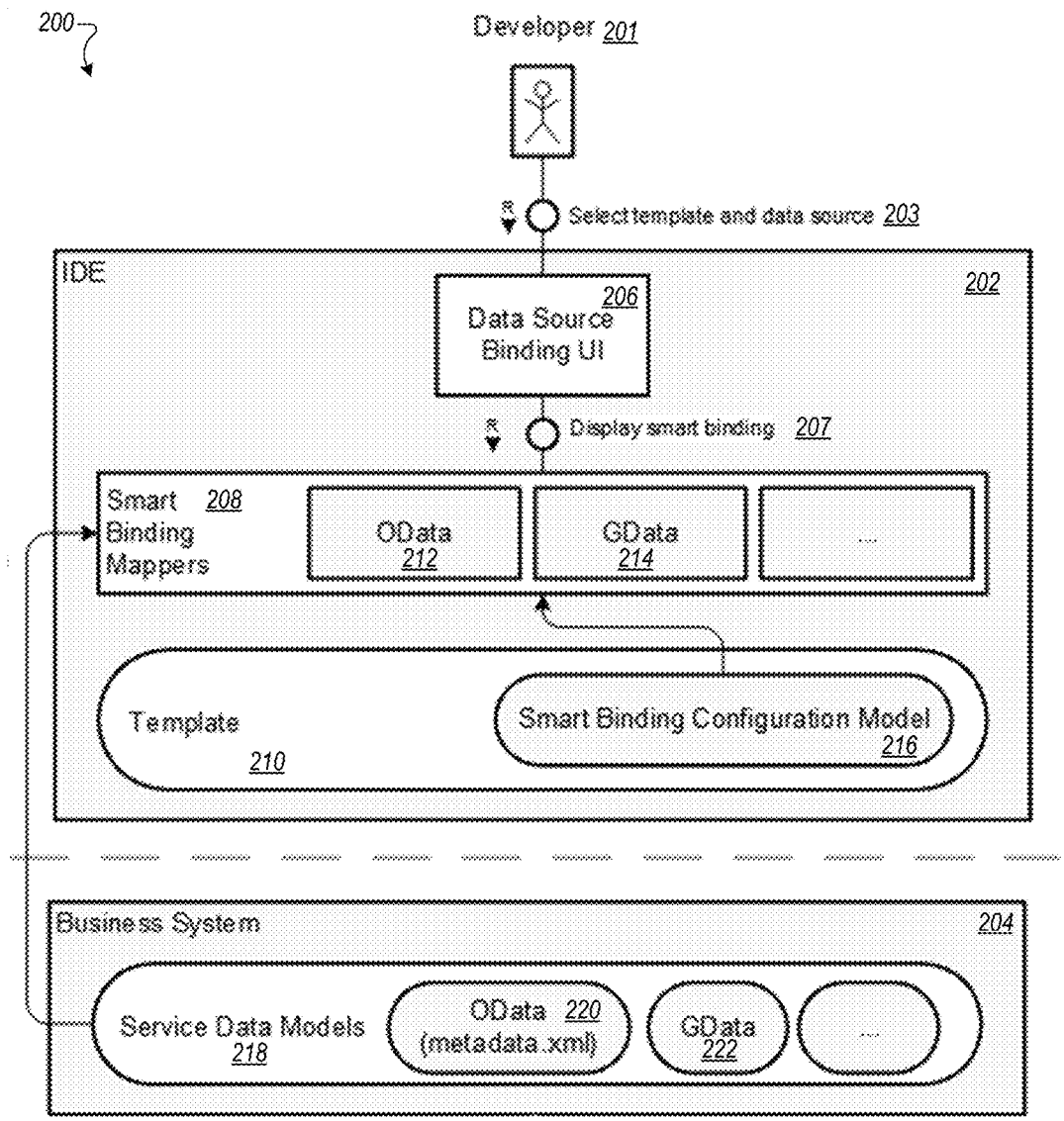
FIG. 2 is a block diagram of an example architecture for a system for completing data bindings between an application and data sources.

FIG. 2 is a block diagram of an example architecture for a system 200 for completing data bindings between an application and data sources. For example, the environment includes an integrated development environment (IDE) 202 for code generation and providing data binding for applications associated with a business system 204. In some implementations, the system 200 can be implemented by the environment 100 described above. For example, a developer 201 (e.g., the user 109) can use the system 200 to select (203) a template and data source for an application being developed.

The developer 201 uses the IDE UI, for example, to select a template and a specific data source. Based on the developer's input, the data binding UI can suggest options for data binding for each relevant input parameter of the template, from which the developer 201 can choose to customize the template in order to create the desired application. In order to do so, the data binding UI can use smart binding mappers 208 that are implemented specifically for each protocol of data sources. This mappers 208 can use the smart binding configuration that is defined as part of the template (for example, using the data model 121, and also the specific data source selected by the developer (e.g., from service data models 218 and associated schema (e.g., metadata.xml of a data source service). The mappers 208 can analyze the inputs to find appropriate matches from the data source that can be used as data binding for each of the template input parameters according to their binding configurations. One example for such binding configuration is that the data for a list of items displayed in the application must come from an entity set of an OData service. In other words, the template input parameter can be the "list data source" and the parameter's value can be required to be a name of an entity set from the selected data source OData service). According to this analysis, the mappers 208 can return possible values for each input parameter of the template for displayed in the data binding UI. The developer can choose, from the suggested options, the value that best suites his needs.

In some implementations, there can be dependencies in user selection of data binding in one input parameter to calculate the possible values for data binding for another input parameter. For example, the binding for the title of each item in the list, which can be any property of the entity set providing the data for the list items, can be suggested only after the list entity set was selected by the user. Therefore, with each user selection, the mappers 208 can recalculate the suggested data binding options and return only the values that can be determined at the current state.

The IDE 202 can include a data source binding user interface (UI) 206 that the developer 201 can use to perform the data binding. In some implementations, the client application 114 can provide or include the data source binding UI 206, which can display (207) binding-related information and receive inputs from the developer 201.

Smart binding mappers 208 can perform the actual data binding using information different data sources, e.g., using relevant data source-specific mappers 212 and 214 as needed. The data source-specific mapper 212, for example, are specific mapper implementations, e.g., including mapping logic that depends on the specific data source service protocol to analyze a specific data source according to binding configurations. As such, the mappers 2121, 214 can provide a description of the available data inputs to be bound. The data source-specific mapper 212 can also provide metadata for each service, e.g., from which applicable data sources can be suggested. In some implementations, the smart binding mappers 208 can be implemented using the data binding module 122 and/or other components of the client application 114. The smart binding mappers 208 can use a template 210 (e.g., corresponding to the selected template at 203) which can include a smart binding configuration model 216 that defines the format and information needed to complete the data bindings.

The IDE 202 can interface with a business system 204. Service data models 218 included in the business system 204 can include data definitions 220 and 222 from which the service data models 218 can support the smart binding mappers 208. In some implementations, some or all of the business system 204 can be implemented by the server 104 and/or systems accessible by the server 104.

In some implementations, data binding solutions provided in the system 200 example, can allow the use of any relational data model (e.g., service data models 218 for specific data sources 111) as input. For example, using the relational data model as input, "smart" binding configurations can be defined that will translate into relevant suggestions for the application developer (e.g., the user 109) during binding of an application to a specific data source 111. The smart binding configurations can be defined, for example, in a design-time model file, e.g., provided by the client application 114. In some implementations, the design-time model file (e.g., input data models 121) is part of the template, and as such, describes the data model of the template.

In some implementations, a smart binding configuration can consist of the following elements. A reference into the input data models 121 can use a reference syntax that supports defining paths/pointers both in the specific input data model and in the design-time model file (e.g., XPath for XML, JSONPath for JSON (JavaScript Object Notation), etc.). The reference into the input data model can be a required element, for example. In some implementations, the smart binding configuration can optionally include filtering and validation parameters specific to the input data model, e.g., including filter parameters based on navigation property multiplicity, parameter types, entity types, and other information. In some implementations, the smart binding configuration can optionally include a user selection or input parameter that can hold the values selected or input by the application developer. The user selection or input parameter can enable the template developer to configure smart binding based on user selection for specific parameters. For example, based on a collection selected by the user, properties (e.g., fields) associated with the user-selection can be automatically suggested, e.g., in another parameter. In some implementations, the smart binding configurations and data model files can be generic and can be relevant for any relational data model data source, e.g., not specific to terms associated with other specific protocols. In this way, these configurations can be used for matching against any supported data source, e.g., using the appropriate mappers, e.g., mappers 212, 214, etc. Further, a single template and associated binding configurations can be customized by using data sources of different types.

Example components used in a smart binding configuration are provided. An AppCollection parameter can be created that can suggest all collections (e.g., sources) associated with a user-selected service. The sources can be referenced, for example, using @datasource.entities, and the sources can be filtered to show only root collections (e.g., using an addressable annotation). In some implementations, the AppCollection parameter can be created using the following code snippet:

```
"AppCollection" :
{
"type" : "Entity",
"isRoot" : "true",
"binding" : "@datasource.entities",
"value" : ""
}
```

A NavigationParam parameter can suggest all navigations from the collection previously selected by user and set into the value of the AppCollection parameter. The parameter can be referenced, for example, by a path such as @myTemplate.parameters.AppCollection.value.navigations. In some implementations, the navigations can be filtered to show only the navigations to multiple entries (e.g., and not single entry). In some implementations, the NavigationParam parameter can be created using the following code snippet:

```
"NavigationParam" :
{
"type" : "Entity",
"multiplicity" : "many",
"isRoot" : "true",
```

```
"binding" : "@myTemplate.parameters.AppCollection.value.navigations",
"value" : ""
}
```

An ItemTitle parameter, for example, can suggest all properties from the collection previously selected by user and set into the value of the AppCollection parameter. This is referenced by the @myTemplate.parameters.AppCollection.value.elements. In some implementations, the ItemTitle parameter can be created using the following code snippet:

```
"ItemTitle" :
{
  "type" : "string",
  "binding" : "@ myTemplate.parameters.AppCollection.value.elements",
  "value" : ""
}
```

IDAttribute and a NumericAttribute parameters, for example, can be used to suggest all properties as in the example above, and the parameters can also facilitate filtering by different qualities of the property as the type or being a key property. In some implementations, the IDAttribute parameter can be created using the following code snippet:

```
"IDAttribute" :
{
  "type" : "Property.Key",
  "binding" : "@myTemplate.parameters.AppCollection.value.elements",
  "value" : ""
}
```

In some implementations, the NumericAttribute parameter can be created using the following code snippet:

```
"NumericAttribute" :
{
  "type" : "Property.Number",
  "binding" : "@ myTemplate.parameters.AppCollection.value.elements",
  "value" : ""
}
```

In some implementations, the smart binding mappers 208 can be used for binding. For example, the smart binding mappers 208 can use the input data model and the design-time model file containing the smart binding configurations to generate reference syntax for the data model and/or design-time model itself. The smart binding mappers 208 can execute any filtering and validations defined for the smart binding configurations.

Figure 3:
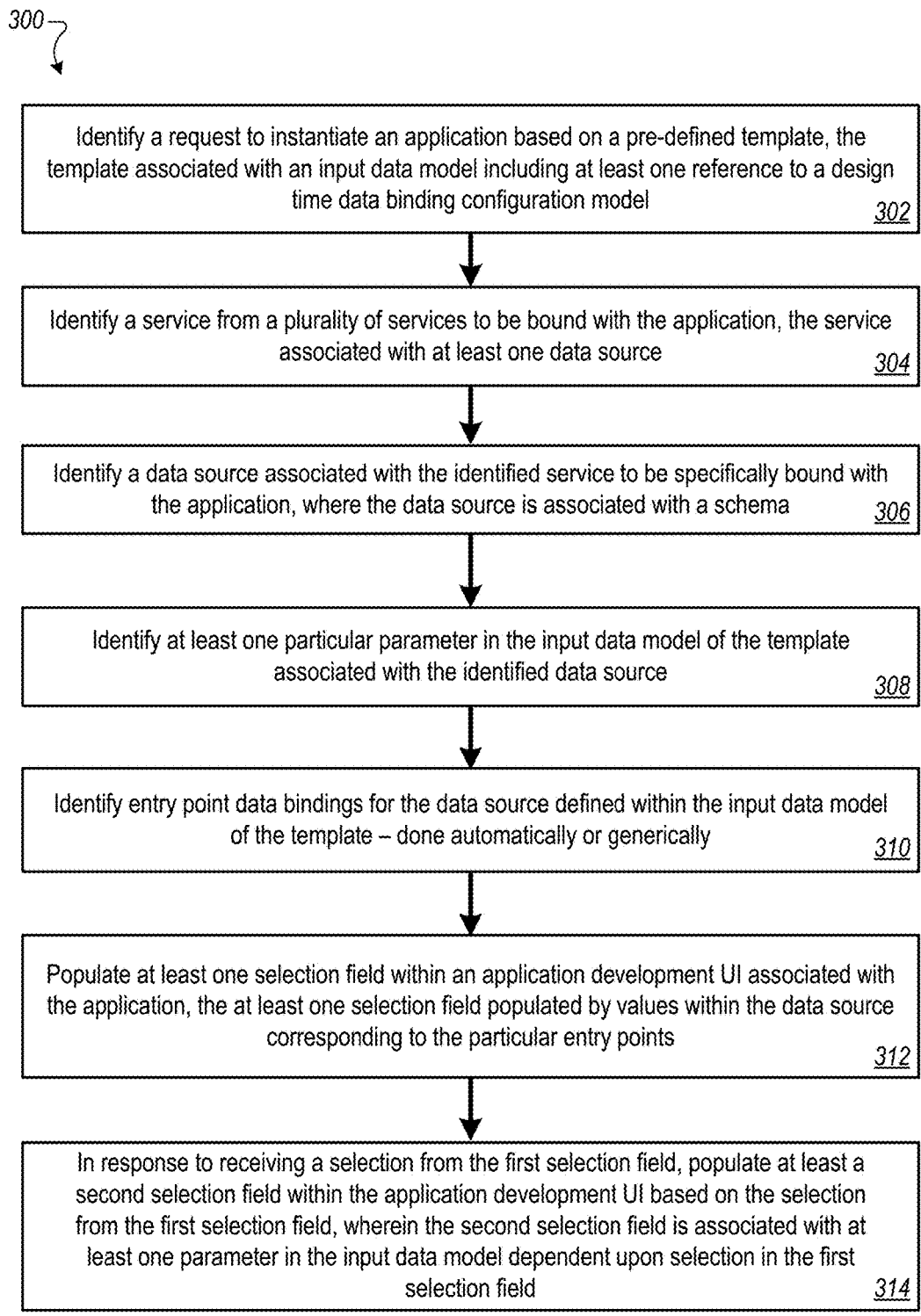
FIG. 3 is a flowchart of an example method for completing data bindings between an application and data sources.

FIG. 3 is a flowchart of an example method 300 for completing data bindings between an application and data sources. For clarity of presentation, the description that follows generally describes method 300 in the context of FIGS. 1-2. However, it will be understood that the method 300 may be performed, for example, by any other suitable system, environment, software, and hardware, or a combination of systems, environments, software, and hardware as appropriate. In some implementations, the client device 102 and/or its components can be used to execute the method 300.

At 302, a request to instantiate an application based on a pre-defined template is identified. The template is associated with an input data model that includes at least one reference to a design time data binding configuration model. For example, the user 109, can use the client application 114 to instantiate an application that is to be stored as a software component 115. The instantiation can be done, for example, through an integrated design environment (IDE) integrated or interfaced with the client application 114. The application can be associated with one of the templates 117, e.g., that have been generated by a template developer or other source. The template 117 can be associated with a particular one of the data models 121, e.g., corresponding to the application that the user 109 is developing. In some implementations, method 300 can be used in situations in which data templates are not used, e.g., as an add-on used in an IDE. In some implementations, the template is configured for use with any of plural data sources, e.g., the template need only be developed once for all possible data sources that have an associated schema.

In some implementations, the request to instantiate the application include a selection of the pre-defined template from plural templates (e.g., received from the client application 114). For example, the user 109 (e.g., application developer) can select a template from a list or display of multiple templates on which to base a new application.

At 304, a service is identified from a plurality of services to be bound with the application. The service is associated with at least one data source 111. For example, using a control provided by the presentation module 118, the user 109 can select a particular service, such as from a list of services provided in a dropdown, a combo box, or through other input. In some implementations, the service can be automatically selected or suggested, e.g., based on the template that the user 109 has selected for use in instantiating the application. In some implementations, information associated with services that can be identified or selected by the user 109 can be stored in the data sources 111.

In some implementations, the service is identified from a service repository or a set of dynamically available services. For example, identifying the service can include a request by the client application 114 to the server 104 for a list of services that the server 104 already stores or can generate upon request.

At 306, a data source associated with the identified service to be specifically bound with the application is identified. For example, using a control provided by the presentation module 118, the user 109 can select a particular data source 111 associated with the user-selected service. The data source 111 is associated with a schema 129, e.g., that corresponds to data in the data source 111. In some implementations, identifying the data source 111 can be optional, as data binding can occur using information associated with the identified service alone. In some implementations, selection of the service causes automatic selection of a data source 111, e.g., without requiring input from the user 109.

At 308, at least one particular parameter in the input data model of the template associated with the identified data source is identified. As an example, the presentation module 118 can present, to the user 109, one or more parameters such as fields that are associated with the data model 121. In some implementations, presentation of a particular field can include, for example, the name of the field, the display name, a description, a data type, a default value, information associated with a valid range of values, and information identifying the field as being mandatory or options. Other information can be presented by the presentation module 118, e.g., information about relationships between the particular field and one or more other fields.

At 310, entry point data bindings for the data source defined within the input data model of the template are identified. For example, the data binding module 122 can identify bindings between the user-selected data source 111 and the data model 121 associated with the template 117. In some implementations, identification of the entry point data bindings can be done automatically or generically. The entry point data bindings that are identified, for example, can be different based on the particular data source 111, which may be significantly different, for example, than the entry point data bindings that would be identified for a different data source 111.

In some implementations, identifying entry point data bindings includes using a definition of an entry point binding as a root entry point. For example, an entry point data binding can be defined as "isRoot" from among optional entry point bindings that can be made.

At 312, at least one selection field is populated within an application development user interface associated with the application. The at least one selection field populated, for example, by values within the data source corresponding to the particular entry points. For example, for the application being developed using the client application 114, the data binding module 122 can automatically provide or generate code associated with the particular parameter selected by the user. The code that is provided, for example, can be used for or integrated into application code that is automatically generated using the client application 114, based on a selected one of the templates 117. In some implementations, populating the at least one selection field includes validating and filtering values associated with the at least one selection field. For example, automatic population of the field(s) is done without requiring validation and filtering of inputs entered by the user, e.g., that may include input errors.

At 314, in response to receiving a selection from the first selection field, at least a second selection field within the application development user interface is populated based on the selection from the first selection field. The second selection field is associated, for example, with at least one parameter in the input data model and dependent upon selection in the first selection field. As an example, using information in the data model 121 for the selected template 117, the client application 114 can identify subsequent fields associated with the template. The subsequent fields that are identified can depend, for example, on fields selected for the user as the initial selection field selected by the user. In some implementations, populated values in the second selection field can depend on the user electing to include or exclude a particular field, or based on the value(s) of the initial field. In some implementations, populating the second selection field includes validating and filtering values associated with the second selection field. For example, automatic population of the field(s) is done without requiring validation and filtering of inputs entered by the user, e.g., that may include input errors.

In some implementations, the method 300 further includes instantiating a wizard for performing data binding in an interactive way. For example, the operations of the method can be performed using facilities of the wizard.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
   identifying a request to instantiate an application based on a pre-defined template, wherein the template is associated with an input data model including at least one reference to a design time data binding configuration model;
   identifying a service from a plurality of services to be bound with the application, wherein the service is associated with two or more data sources, and wherein the service is automatically selected or suggested based on the template;
   identifying a data source associated with the identified service to be specifically bound with the application, wherein the data source is associated with a schema, and wherein identifying the data source includes receiving an automatic selection of the data source from the two or more data sources in response to and based on identifying the service;
   identifying at least one particular parameter in the input data model of the template associated with the identified data source;
   identifying entry point data bindings for the data source defined within the input data model of the template;
   after identifying the entry point data bindings, populating at least a first selection field within an application development user interface (UI) associated with the application, wherein the first selection field is populated by values within the data source corresponding to the particular entry points, and wherein the application development UI includes the first selection field and a second selection field; and
   in response to receiving a selection of one of the populated values from the first selection field, populating at least the second selection field within the application development UI based on the selection from the first selection field, wherein the second selection field is associated with at least one parameter in the input data model dependent upon selection in the first selection field.

2. The method of claim 1, further comprising:
   receiving a selection of the pre-defined template from plural templates.

3. The method of claim 1, wherein the service is identified from a service repository or a set of dynamically available services.

4. The method of claim 1, wherein identifying entry point data bindings includes using a definition of an entry point binding as a root entry point "isRoot" for Odata to identify all the optional entry point bindings that you can do.

5. The method of claim 1, further comprising:
   instantiating a wizard for performing data binding in an interactive way; and
   performing operations of the method using facilities of the wizard.

6. The method of claim 1, wherein the template is configured for use with any of plural data sources.

7. The method of claim 1, wherein populating the first selection field includes validating and filtering values associated with the first selection field.

8. The method of claim 1, wherein populating the second selection field includes validating and filtering values associated with the second selection field.

9. A system comprising:
   memory storing:
      plural templates comprising information from which application code can be customized using parameter values provided by a software developer for a specific template;
      software components comprising the application code generated using the templates;
      data models including information for subsequent fields associated with the plural templates;
      plural data sources comprising plural databases and/or other structures that hold data used in applications;
   an application for:
      identifying a request to instantiate an application based on a pre-defined template, wherein the template is associated with an input data model including at least one reference to a design time data binding configuration model;
      identifying a service from a plurality of services to be bound with the application, wherein the service is associated with two or more data sources, and wherein the service is automatically selected or suggested based on the template;
      identifying a data source associated with the identified service to be specifically bound with the application, wherein the data source is associated with a schema, and wherein identifying the data source includes receiving an automatic selection of the data source from the two or more data sources in response to and based on identifying the service;
      identifying at least one particular parameter in the input data model of the template associated with the identified data source;
      identifying entry point data bindings for the data source defined within the input data model of the template;
      after identifying the entry point data bindings, populating at least a first selection field within an application development user interface (UI) associated with the application, wherein the first selection field is populated by values within the data source corresponding to the particular entry points, and wherein the application development UI includes the first selection field and a second selection field; and
      in response to receiving a selection of one of the populated values from the first selection field, populating at least the second selection field within the application development UI based on the selection from the first selection field, wherein the second selection field is associated with at least one parameter in the input data model dependent upon selection in the first selection field.

10. The system of claim 9, further comprising:
receiving a selection of the pre-defined template from plural templates.

11. The system of claim 9, wherein the service is identified from a service repository or a set of dynamically available services.

12. The system of claim 9, wherein identifying entry point data bindings includes using a definition of an entry point binding as a root entry point "isRoot" for Odata to identify all the optional entry point bindings that you can do.

13. The system of claim 9, operations for the application further comprising:
instantiating a wizard for performing data binding in an interactive way; and
performing operations of the method using facilities of the wizard.

14. The system of claim 9, wherein the template is configured for use with any of plural data sources.

15. A non-transitory computer-readable media encoded with a computer program, the program comprising instructions that when executed by one or more computers cause the one or more computers to perform operations comprising:
identifying a request to instantiate an application based on a pre-defined template, wherein the template is associated with an input data model including at least one reference to a design time data binding configuration model;
identifying a service from a plurality of services to be bound with the application, wherein the service is associated with two or more data sources, and wherein the service is automatically selected or suggested based on the template;
identifying a data source associated with the identified service to be specifically bound with the application, wherein the data source is associated with a schema, and wherein identifying the data source includes receiving an automatic selection of the data source from the two or more data sources in response to and based on identifying the service;
identifying at least one particular parameter in the input data model of the template associated with the identified data source;
identifying entry point data bindings for the data source defined within the input data model of the template;
after identifying the entry point data bindings, populating at least a first selection field within an application development UI associated with the application, wherein the first selection field is populated by values within the data source corresponding to the particular entry points, and wherein the application development UI includes the first selection field and a second selection field; and
in response to receiving a selection of one of the populated values from the first selection field, populating at least the second selection field within the application development user interface (UI) based on the selection from the first selection field, wherein the second selection field is associated with at least one parameter in the input data model dependent upon selection in the first selection field.

16. The non-transitory computer-readable media of claim 15, further comprising:
receiving a selection of the pre-defined template from plural templates.

17. The non-transitory computer-readable media of claim 15, wherein the service is identified from a service repository or a set of dynamically available services.

18. The non-transitory computer-readable media of claim 15, wherein identifying entry point data bindings includes using a definition of an entry point binding as a root entry point "isRoot" for Odata to identify all the optional entry point bindings that you can do.

19. The non-transitory computer-readable media of claim 15, operations for the application further comprising:
instantiating a wizard for performing data binding in an interactive way; and
performing operations of the method using facilities of the wizard.

20. The non-transitory computer-readable media of claim 15, wherein the template is configured for use with any of plural data sources.

* * * * *